Figure 1:
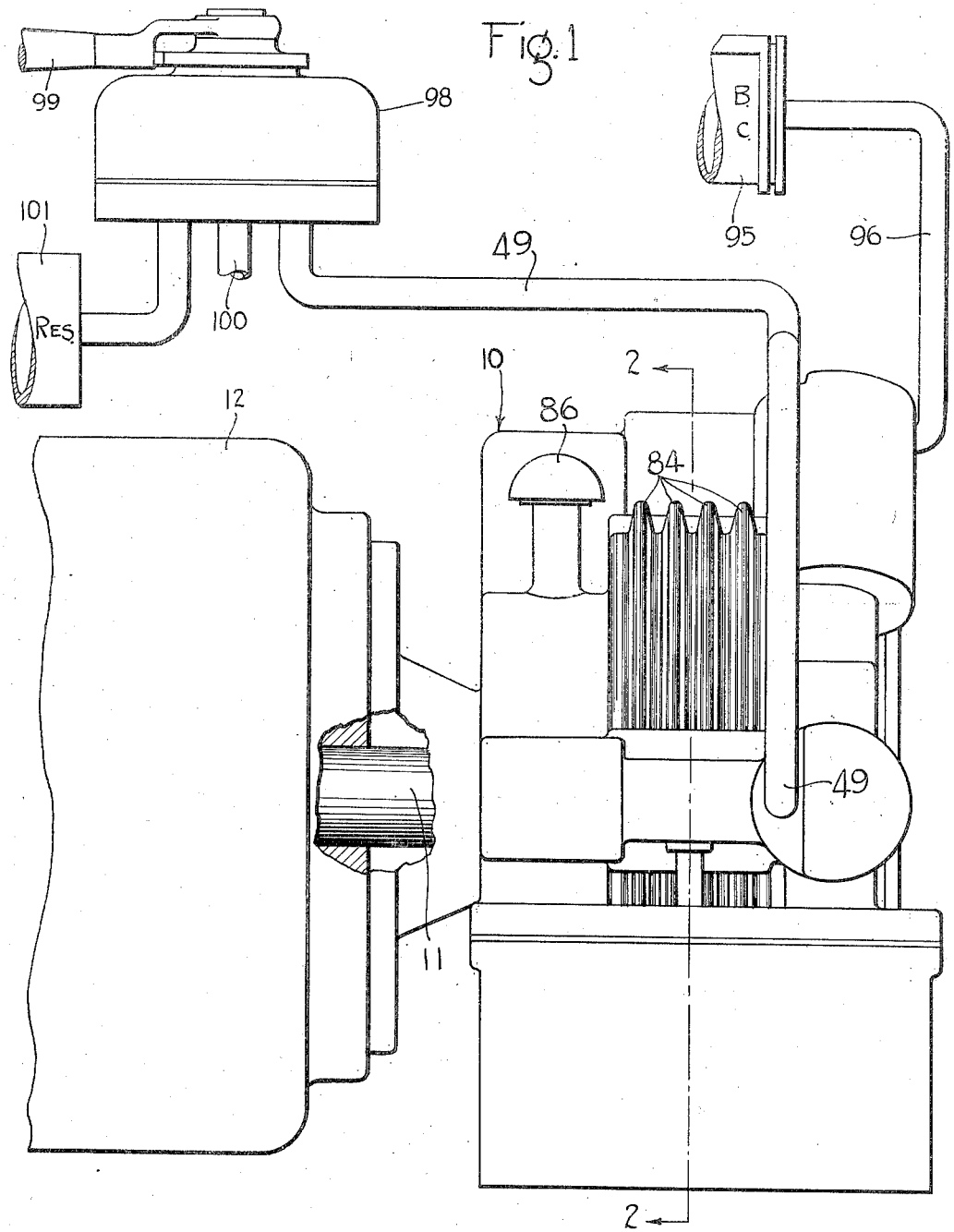

INVENTOR
BURTON S. AIKMAN
BY Wm. M. Cady
ATTORNEY

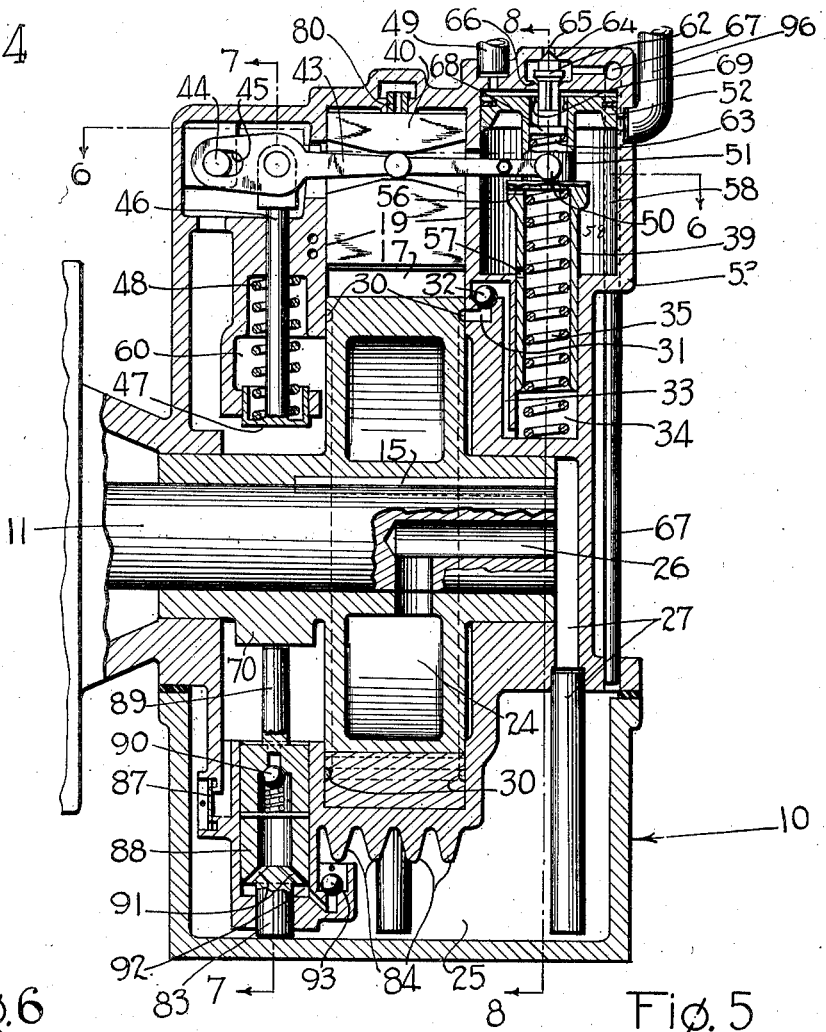

April 26, 1938.   B. S. AIKMAN   2,115,547
HYDROPNEUMATIC BRAKE
Filed April 11, 1936   5 Sheets-Sheet 4

INVENTOR
BURTON S. AIKMAN.
BY
Wm. M. Cady
ATTORNEY

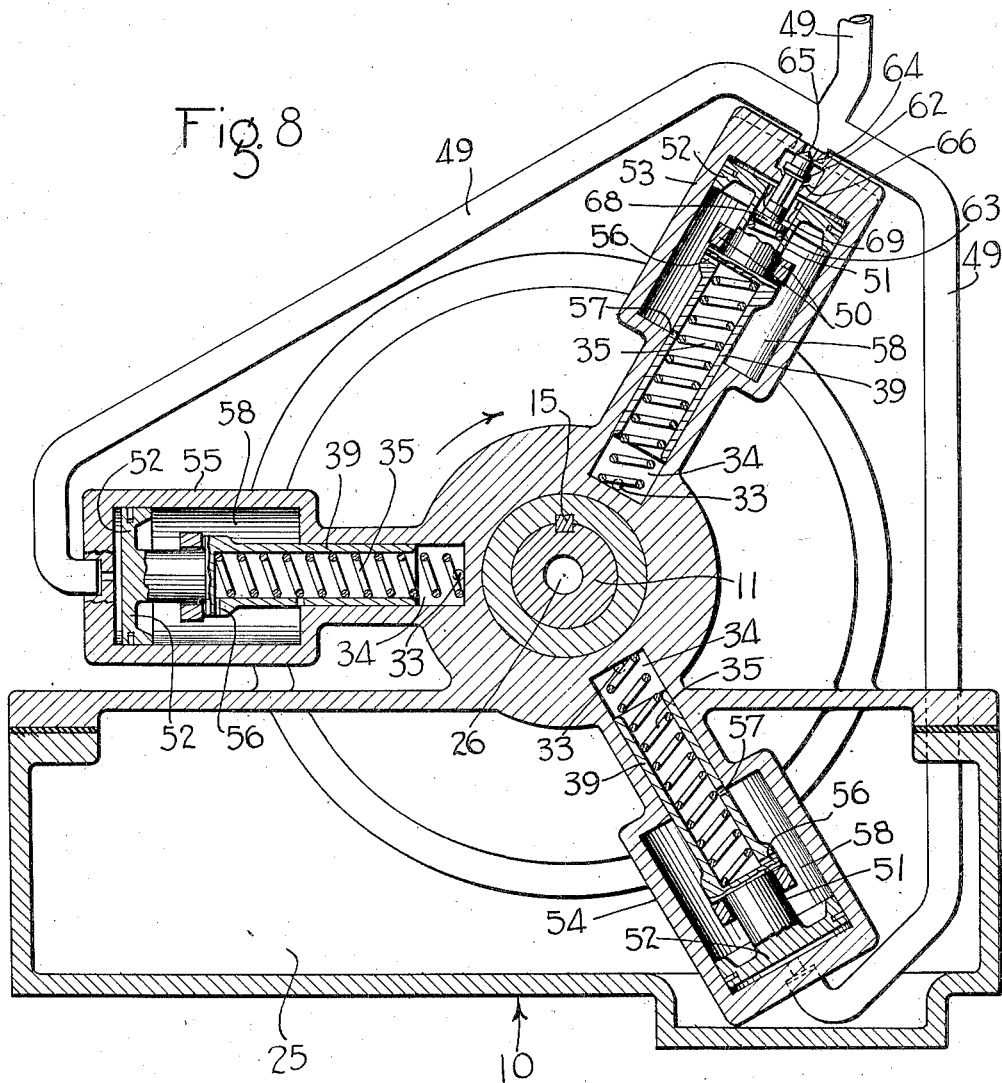

Patented Apr. 26, 1938

2,115,547

UNITED STATES PATENT OFFICE 2,115,547

HYDROPNEUMATIC BRAKE

Burton S. Aikman, Wilkinsburg, Pa., assignor to The Westinghouse Air Brake Company, Wilmerding, Pa., a corporation of Pennsylvania Application April 11, 1936, Serial No. 73,855

28 Claims. (Cl. 188—90)

This invention relates to hydro-pneumatic brakes, and more particularly to hydro-pneumatic brakes for railway vehicles.

In recent years the advent of railway vehicles operating at high speeds has introduced new problems in the art of braking railway vehicles. A type of brake device particularly adapted for use in connection with high speed railway vehicles has been disclosed and claimed in my pending application Serial No. 4,041, for a Hydro-pneumatic brake, filed January 30, 1935 and which has matured into Patent 2,065,203 issued December 22, 1936. In this type of brake device, and insofar as I am aware in those heretofore proposed by others also, a stator member and a rotor member are provided and the braking effect is produced through action of the rotor member in forcing a fluid through a restricted orifice in the stator member, the size of this orifice being varied according to the degree of braking effect desired. The fluid acted upon is first supplied to a braking chamber and then forced by the rotor through the orifice in the stator to a convenient supply chamber or reservoir, and then re-circulated by the rotor in the manner described.

In the present invention I have departed from this principle of operation and have provided a brake device operating upon a different and improved principle. In the present invention a rotor member is provided having a plurality of vanes or blades attached thereto for coaction with a set of similar but different number of vanes or blades associated with a stator member, the two sets of blades or vanes operating upon a fluid contained in a braking chamber to impart a series of periodic, overlapping braking impulses to the rotor, in a time sequence or phase relation similar to that existing between the single phase electric currents in a polyphase alternating current motor or generator.

The fluid acted upon by the coacting vanes or blades need not be continuously re-circulated, as in the previous brake devices referred to, in order to obtain a braking effect, but is always present in the braking chamber to produce braking impulses on the rotor. By the utilization of this principle a greater braking effect may be produced for a given size of device, in comparison with devices utilizing the principle heretofore employed. In addition, a brake device embodying this principle will produce a more uniform braking effect, and thus tend to decelerate a vehicle more smoothly.

In the brake device of my above referred to pending application, as well as in the devices heretofore proposed by others, the essential parts of the rotor and stator members effective in producing braking are disposed in an eccentric arrangement. That is to say, the rotor member is disposed eccentric to the shaft supporting it, or the stator braking chamber is eccentric to the rotor, or some other similar eccentric arrangement obtains. Eccentric arrangements are always undesirable in apparatus intended for operation at high speeds, as here, because difficult problems of balancing unbalanced forces arise. For example, if the rotated mass is eccentric to the rotating center, means must be provided to equalize the unbalanced centrifugal forces resulting, or otherwise non-uniform wear of certain of the parts will inevitably result.

In the present invention, in order to eliminate the problems which arise in connection with eccentric arrangements of parts, I provide a brake device designed on the principle of concentricity of parts.

In brake devices of the type herein contemplated it will be obvious that certain parts will be subjected to extremely high fluid pressures. If certain of the movable parts, as the stator vanes, do not have these pressures balanced on all sides it will be apparent that relatively large forces will be required to move these parts in controlling operation of the brake device, and that the sensitivity of control will thereby be affected. In order to increase the sensitivity of the control, I contemplate as a part of my invention the provision of means for insuring that all control parts subject to braking pressures shall have the pressures thereon so balanced as to permit movement of these parts by light control pressures.

Where trains or railway vehicles are to be stopped from relatively high speeds it is highly desirable that the wheels be prevented from sliding, as it is well known that the retarding effect produced by sliding wheels is much less than that produced by rolling wheels, aside from the damage to the wheels due to sliding. In order that wheel sliding shall be reduced to a minimum, or entirely prevented, I contemplate as a further part of my invention the provision of a brake device with improved means for correcting a wheel sliding condition in the incipient stage.

Long experience with brake equipments for railway vehicles has demonstrated that the control of the braking by means of compressed air, or a similar fluid, is highly reliable and possesses advantages of flexibility and simplicity of operation not as favorable in other control systems. Accordingly, therefore, I contemplate as a further part of my invention the provision of control means for controlling the degree of braking produced by my improved brake device in accordance with pneumatic pressures established by a suitable control device.

As will be apparent to those skilled in the art, fluid brake devices of the character herein disclosed are ineffective after a vehicle has been brought to a stop. Therefore, an auxiliary brake device must be provided to produce a sufficient braking effect to hold the vehicle at rest, and to insure stopping. Moreover, safety considerations dictate the necessity and desirability of having an auxiliary brake which may be automatically applied upon failure of the primary brake. Accordingly therefore, it is a yet further object of this invention to provide an improved fluid type brake in association with an auxiliary brake, with means for effecting an application of the auxiliary brake upon failure of the fluid brake, and when the vehicle has been brought to rest.

Further objects of the invention dealing with constructions and arrangements of parts for producing a brake device simple in construction, capable of effectively operating over a long period of time, and which requires little maintenance and adjusting, will be fully apparent from the following description of an embodiment of my invention, which is illustrated in the attached drawings, wherein, Fig. 1 shows a brake device embodying my invention coupled to the shaft of a vehicle drive motor.

Figure 2:
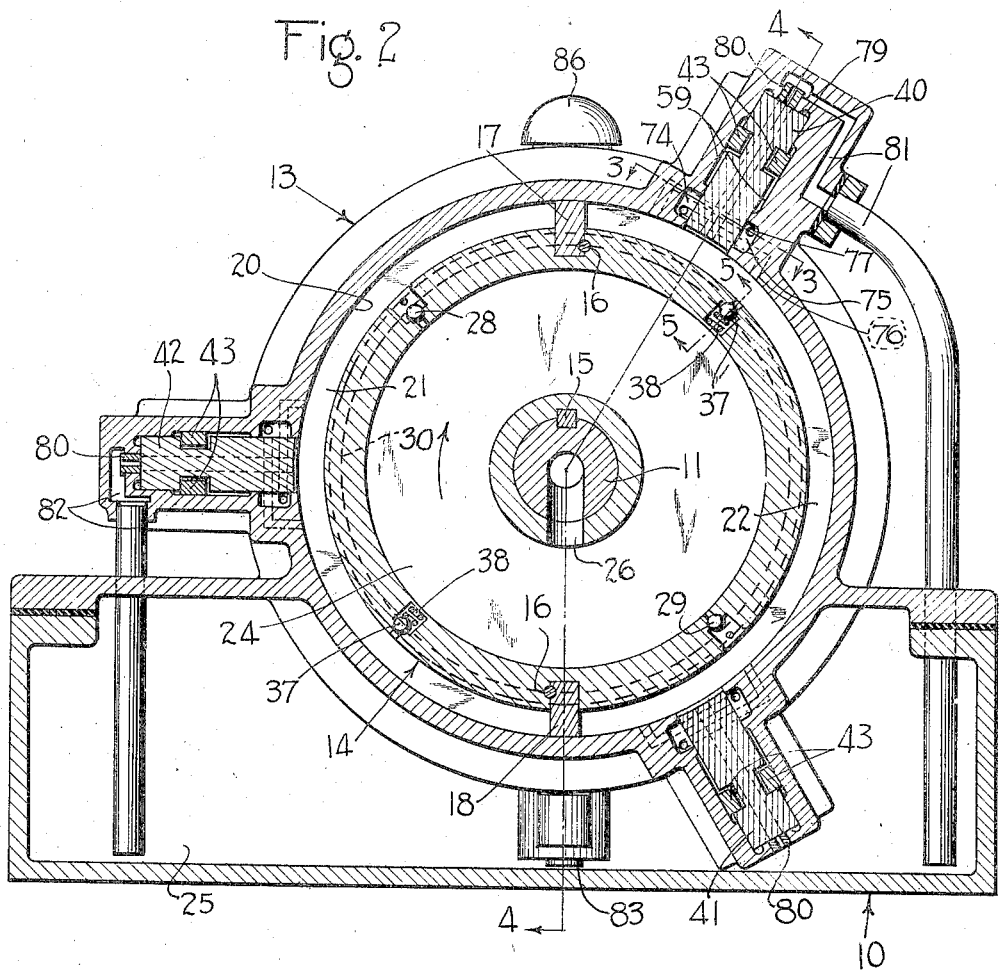

Fig. 2 is a diagrammatic sectional view taken along the line 2—2 of Fig. 1.

Figure 3:
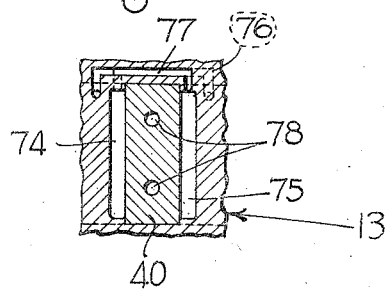

Figs. 3, 4, and 5 are, respectively, sectional views taken along the lines 3—3, 4—4, and 5—5 of Fig. 2.

Figure 7:
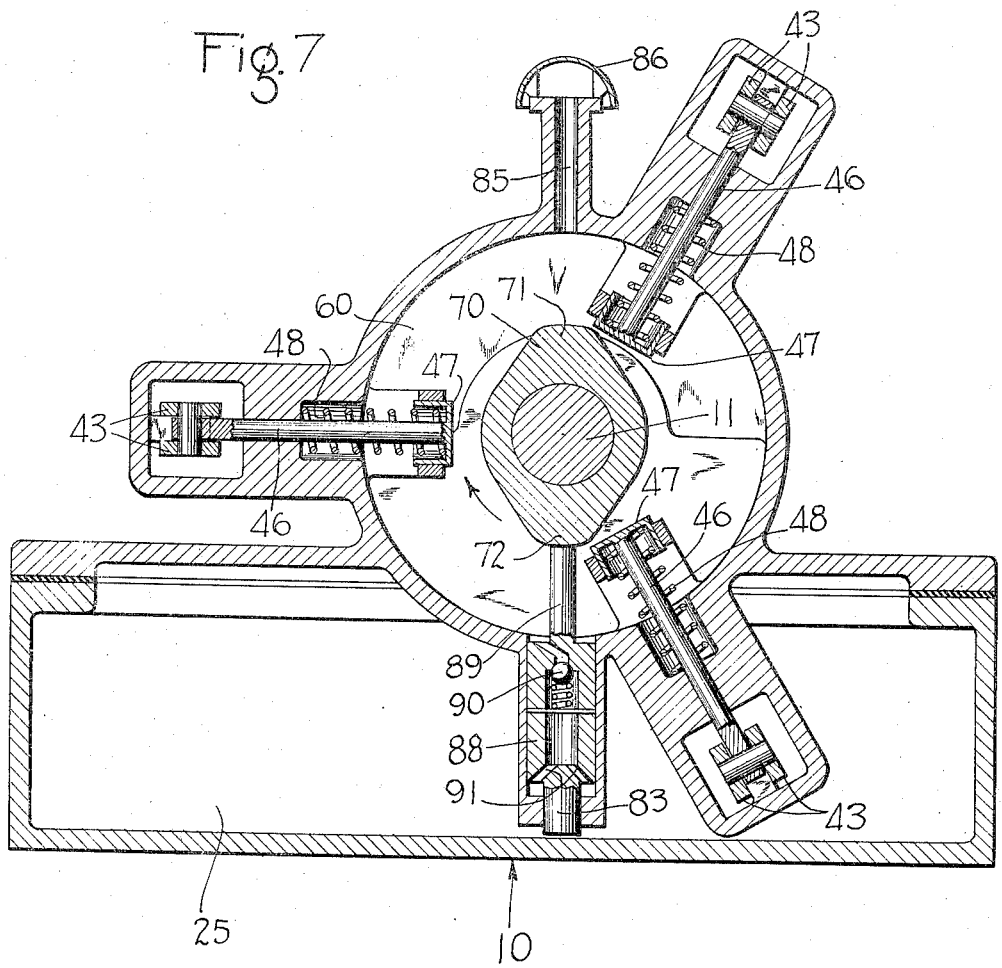

Figs. 6, 7, and 8 are, respectively, sectional views taken along the lines 6—6, 7—7, and 8—8 of Fig. 4.

In Fig. 1 I have shown the brake device embodying my invention at 10 as coupled to a shaft 11 of a vehicle drive motor 12. In modern high speed trains each of the drive motors is usually coupled to a vehicle axle through suitable gearing, so that the drive motor operates at a speed considerably above the speed of the axle. As will appear more fully hereinafter, the very nature of my brake device makes it more adaptable for connection to a drive motor shaft than for assembly on a vehicle axle, so that there is a practical utility in having the device connected to the motor axle.

Referring now principally to Figs. 2 and 4, the stator member of the brake device 10 is shown at 13, while the rotor member is shown at 14 concentric with and secured by a key 15 to the motor shaft 11. As shown, the rotor 14 is rotatable within and concentric to the stator member 13, and has secured thereto, by key pins 16 and in diametrically opposing relationship, two vanes or blades 17 and 18. These two vanes or blades interfit with side walls 19 and outer wall 20 of the stator member to define two pressure-tight chambers 21 and 22, which for convenience will hereinafter be referred to as braking chambers. As will be observed, these chambers are of equal volume which is unchanged by the rotation of the blades 17 and 18.

Within the rotor 14 is a chamber 24, which is in communication with a fluid supply reservoir 25 in the stator member by way of passage 26 through the shaft 11, and pipe and passage 27. The chamber 24 is in communication with the braking chamber 21 by way of ball check valve 28, and is also in communication with the braking chamber 22 by way of ball check valve 29. Along each side of the rotor, adjacent its periphery, is an annular groove 30. One of these grooves is at all times, as may be seen from Fig. 4, in communication with a passage 31 in the stator member, which leads past the ball check valve 32 and passage 33 to each of three chambers 34.

As may be seen from Fig. 5, the two annular grooves 30 may be in communication with the braking chamber 22, and similarly also with the braking chamber 21, by way of passages 36 and ball check valve 37. The ball check valve 37 is urged toward a seated position by a spring 38, but may be unseated by fluid under pressure above the ball valve, so that this fluid may flow to both grooves 30. Fluid flowing to the right hand groove 30 (as viewed in Fig. 4) may flow past the ball valve 32 to the chambers 34, but flow is prevented in the reverse direction by the ball valve. The purpose of providing two grooves 30 is so that the pressure of this fluid may be balanced on either side of the rotor.

Associated with the stator member 13, and movable radially with respect thereto, are three blades or vanes 40, 41, and 42. These blades are disposed equi-distantly apart in the same plane about the axis of rotation of the rotor, that is, they are 120° apart. As shown in Fig. 4, each of these blades is carried by an arm 43 which is pivotally mounted at one end on a pin 44. The pin 44 passes through an elongated aperture or slot 45 in the end of the arm 43 so as to provide for lateral movement of the arm as it is rotated. Secured to the arm 43 between the pivot pin 44 and the connection with the stator blade is a rod 46 terminating in a head 47. Disposed between the inner side of this head 47 and a portion of the stator casing is a spring 48, which is normally under sufficient tension to urge the rod 46 downwardly, and thereby urge the arm 43 to rotate in a clockwise direction.

The free end of each arm 43 is provided with bifurcations 50 which embrace but are not secured to a hollow stem 51 of an application piston 52. As more clearly shown in Fig. 8, there are three of these application pistons 52, corresponding to the three blades 40, 41, and 42, each piston being operative in one of three cylinders 53, 54, and 55, disposed about the rotor axis 120° apart, as are the stator blades.

The piston 52 in each cylinder is subject on its outermost side to pressure of fluid, such for example as air under pressure, supplied to its cylinder by way of pipe 49, and is subject on its innermost side, through stem 51, to pressure exerted by a balancing piston 39. The balancing piston 39 is subject on its innermost side to the combined pressure of a release spring 35 and pressure of fluid in chamber 34. The balancing piston 39 is provided with a restricted port 56 and a larger port 57, for the purpose of providing communication between the chamber 34 and chamber 58 below each piston 52. Thus fluid supplied to the chamber 34 may flow through one or both ports 56 and 57 to the chamber 58, and from this chamber through passages 59 alongside each stator blade or vane (see Fig. 2) to a filling chamber 60, from which it may be returned to the supply chamber 25 as will hereinafter be more fully described.

Associated with the cylinder 53 is a valve 62 which, as shown in Figs. 4 and 8, for the outermost position of the application piston 52 is urged by a spring 63 against a seat 64 to close an exhaust port 65. At the same time the valve is urged away from an inner seat 66 to provide communication between pipe 49 and pipe and passage 67 leading to the supply chamber or reservoir 25. When the application piston 52 in chamber 53 moves inwardly to a predetermined degree, a flange 68 engages lugs 69 on the piston to move the valve 62 away from seat 64 and in engagement with seat 66. This closes communication between pipe 49 and chamber 25 and opens a communication between this chamber and the atmosphere, by way of exhaust port 65.

The stator blades 40, 41, and 42 are normally positioned as illustrated by action of the release springs 35, which are heavier than the application springs 48.

When air under pressure is supplied to each of the cylinders 53, 54, and 55 the piston 52 therein will be actuated inwardly. This movement of each piston overcomes the heavy spring 35 and permits the relatively lighter spring 48 to rotate the associated arm 43 in a clockwise direction, thus moving the stator blades 40, 41, and 42 inwardly, the degree of movement being proportional to the air pressure acting on piston 52. As may be seen from Fig. 2, this movement of the stator blades places them directly in the path of movement of the rotor blades 17 and 18 if the rotor is rotating. In order that the stator blades shall be actuated out of the path of movement of the rotor blades as the rotor blades approach, there is provided on the rotor a cam 70, which as shown in Fig. 7 has two raised portions 71 and 72. These raised portions are diametrically opposite from each other, and a line drawn diametrically through the centers of these raised portions is coincident with a line drawn diametrically through the centers of the two rotor blades 17 and 18, so that as each rotor blade approaches a stator blade one or the other of the high portions of cam 70 will engage the associated head 47 to rotate the associated arm 43 in a counterclockwise direction and thereby lift the stator blade out of the path of movement of the rotor blade.

As soon as the rotor blade has passed the cam 70 will permit the associated spring 48 to return the stator blade to its inner position. It will thus be seen from the arrangement shown and described that when air under pressure is supplied to each of the cylinders 53, 54, and 55, that the stator blades will be urged inwardly into the path of movement of the rotor blades and will in timed relation therewith be actuated outwardly to permit the rotor blades to pass without mechanical contact therebetween.

Now when a fluid is contained in the two braking chambers 21 and 22 it will be obvious that when the stator blades move inwardly the fluid trapped between a rotor blade and a stator blade must be forced past the orifice formed between the innermost edge of a stator blade and the outer periphery of the rotor. The resultant pressure exerted on the fluid by the rotation of the rotor blades will, of course, react on the rotor to produce a retarding effect, this retarding effect being proportional to the size of the orifice formed between the inner edge of the stator blade and the rotary periphery, and hence according to the degree to which the stator blade has been actuated inwardly.

As the rotor blade approaches the stator blade the cam 70 will function to move the stator blade outwardly and thus release the pressure exerted on the fluid between the two blades. This will, of course, diminish the retarding force exerted on the rotor due to this one set of blades, but if a plurality of rotor and stator blades are disposed in an arrangement as illustrated and described, then when the retarding force produced by one stator blade is diminishing from a maximum due to outward movement of that stator blade, a maximum retarding force is at the same time being produced by the inward movement of another stator blade, so that the retarding impulses produced by the interaction of the several rotor and stator blades will impart to the rotor a retarding effect somewhat similar to the torque produced on a rotor in a polyphase alternating current motor. The resulting effect will therefore be to produce a continuous retarding effect on the rotor approaching constancy.

As already described, the degree of braking is controlled by controlling the inward movement of the stator blades. It will be obvious that the pressure exerted on the fluid trapped between a rotor and a stator blade will manifest an extremely high pressure on one side of the stator blade, so that if this pressure is not balanced on all sides of the stator blade the stator blade will not be sensitive or respond to comparatively small control pressures in the cylinders 53, 54, and 55.

In order to balance the pressures on the different sides of the stator blades, I provide on the two sides of each stator blade chambers 74 and 75 (see Fig. 3). The chamber 74 on the one side of a stator blade is in communication by way of a passage 76 with the portion of the braking chamber adjacent the other side of the blade, and similarly the chamber 75 on one side of a blade is in communication by way of a passage 77 with the portion of the braking chamber adjacent the other side of the blade. Therefore, the pressures in chambers 74 and 75 will correspond to the pressures in that portion of the braking chamber adjacent the opposite side of the stator blade. The size of the chamber on either side of a stator blade is designed so that the pressure acting on both sides of the blades shall be balanced as near as practicable.

In order that the pressures on the inner and outer ends of a stator blade shall also be balanced, each stator blade is provided with passages 78 (see Fig. 3) extending radially therethrough between the adjacent braking chamber at the inner end of the blade and a chamber 79 at the outer end of the blade. Each chamber 79 will therefore have fluid supplied to it through the passage 78 at substantially the same pressure as existing in the braking chamber at the other end of the blade. Thus it will be seen that the pressure acting on all sides of a stator blade will be substantially balanced so as to make it possible to control movement of the blade with small control pressures.

From the standpoint of braking alone once fluid has been supplied to the two braking chambers 21 and 22 sufficient to fill these chambers no further supply is required. However, from the standpoint of cooling of this fluid it is desirable that at least a portion shall during braking be circulated to the supply chamber 25 and then back to the braking chambers. In order to provide for this I have arranged a restricted port 80 between each of the chambers 79 and a communication leading to the supply reservoir 25.

As may be seen from Fig. 2, from chamber 79 at the end of blade 40 this communication includes pipe and passage 81. From the chamber at the outer end of blade 42 this communication includes pipe and passage 82. From the chamber at the end of blade 41 the communication includes only the restricted port 80. Thus a small amount of fluid is permitted to pass from the braking chambers to the storage chamber 25, and may be circulated therefrom (by means to be described presently) through pipe and passage 27, and passage 26, to chamber 24 in the rotor, from which it may pass by way of check valves 28 and 29 back to the braking chambers. In addition to this means of cooling, I provide fins 84 on the outer periphery of the stator member, which fins provide additional radiating surface for liberating the heat generated in the fluid in the braking chambers.

When the stator blades are in their outermost position, as illustrated in Fig. 2, each blade closes the restricted port 80, so that when no braking operation is being performed the fluid in the braking chambers is not circulated to the supply reservoir 25 but is merely carried around with the rotor.

When supplying a braking fluid to the brake device to render it operative, this may be admitted through a filling passage 85 by removing a filling plug 86. Fluid will then be admitted to the filling chamber 60, from which it may flow past a check valve 87 to the supply chamber 25.

During a braking operation the chamber 25 is maintained under air pressure, so that check valve 87 will be held seated. Thus fluid flowing to the chamber 60 from the chamber 58 in each of the cylinders 53, 54, and 55, and due to leakage past the rotor and stator blades, cannot flow past this check valve. In order to force the fluid in chamber 60 to the chamber 25, and thus insure that adequate fluid will be available for circulation to the braking chambers during braking operation, I have incorporated a pump device which as shown in Fig. 4 comprises a piston 88 having a head 83 subject to the air pressure in chamber 25 so as to urge piston rod 89 into engagement with and cause the piston to be reciprocated by the high portions of the cam 70.

As will be obvious, the piston 88 will be reciprocated twice for each revolution of the rotor. Fluid in chamber 60 may flow past a spring seated ball valve 90 and through port 91, in the piston, to a chamber 92. The reciprocating motion of the piston will then force the fluid from this chamber past another ball valve 93 to the supply chamber 25. Thus it will be seen that there will be a positive circulation of sufficient fluid to provide for cooling purposes, and also to take care of the leakage incident to the operation of the device.

When the vehicle approaches a stop and the speed of the rotor diminishes to a low value, it will be obvious that the braking effect produced will likewise diminish, and will diminish to zero when the vehicle comes to rest. In order that there shall be adequate braking to hold the vehicle at rest, and to insure stopping, I have provided an auxiliary brake device which is indicated by the brake cylinder 95 in Fig. 1. It is to be understood that this brake cylinder is the operating device for a conventional type of friction brake, which has not been illustrated because so well known. The brake cylinder is connected by pipe 96 to the cylinder 53.

As shown particularly in Fig. 4, this connection is by way of a port so located that when air under pressure is supplied to this cylinder the application piston 52 therein must be actuated inwardly a predetermined distance before the pipe 96 is opened to the piston chamber, and hence to communication with the pipe 49. It is intended that this communication shall take place at about the same time the valve 62 is actuated to its inner seat 66, so that the auxiliary brake shall be applied at about the time the fluid brake becomes ineffective, or greatly reduced in effectiveness.

The control of air under pressure to the cylinders 53, 54 and 55 may be by any suitable means, and I have as one example shown a means in the form of a rotary type brake valve device 98 operated by a handle 99. In release position of the handle 99 the pipe 49 is connected to an exhaust pipe 100. In application position of the handle 99 the pipe 49 is disconnected from the exhaust pipe 100 and connected to a reservoir 101, which is supplied with air under pressure by a suitable compressor (not shown). In lap position of the handle 99 the pipe 49 is disconnected both from the reservoir 101 and exhaust pipe 100. The pressure of air supplied to the pipe 49 is varied by manipulation of the handle 99 between the positions described, in the same manner as for standard air brake systems.

The operation of this embodiment of my invention is as follows:

Operation

When a vehicle equipped with my improved brake device is being driven under power or coasting the brake valve handle 99 is maintained in its release position, so that all three cylinders 53, 54, and 55 will be vented to the atmosphere through the brake valve device.

Now since in the fluid brake device the release springs 35 are made heavier than the application springs 48, with the application cylinders vented the stator blades 40, 41, and 42 will be held in their outermost or release position.

Assuming now clockwise rotation of the rotor and that a braking fluid will have been previously supplied to the braking chambers 21 and 22, the rotor which is now rotating at a speed corresponding to the speed of the vehicle, merely carries this fluid around with it without producing a braking effect. This fluid, which is preferably a suitable type of oil, also serves as a lubricant for the relatively moving parts.

When it is desired to effect operation of the brake device to produce a braking effect, the brake valve handle 99 is turned to the application position and left there long enough to supply air under pressure to pipe 49 to a degree according to the desired degree of application of the brakes. The brake valve handle is then turned to the lap position. Air under pressure supplied to the three cylinders 53, 54, and 55 will actuate the application pistons 52 therein inwardly, compressing the release springs 35. Application springs 48 will then rotate the arms 43 in a clockwise direction and thus move the stator blades inwardly. At the same time that air under pressure is supplied to the three chambers 53, 54, and 55, it is also supplied by way of pipe and passage 67 to the supply chamber 25 so that this chamber is placed under pressure.

Assuming now that as the stator blades move inwardly the relative positions of the parts are as shown in Figs. 2 and 7, it will be apparent that due to the positions of the high portions of the cam 70 blade 40 will at this time be arrested and held in its outermost position, blade 42 will move the full distance inwardly, while blade 41 will just begin to move inwardly as the rotor rotates further. Thus as the rotor rotates the rotor blade 18 and the stator blade 42 will act upon the fluid in braking chamber 21 trapped therebetween to produce a braking effect on the rotor, while rotor blade 17 and stator blade 41 will at first produce a small braking effect which increases as the rotor rotates and permits blade 41 to move inwardly.

When the rotor has rotated through approximately 60° from the position illustrated in Fig. 2, the rotor blade 40 will begin to move inwardly while the blade 42 will have just reached its outer position. During this transition the blade 41 will have moved to its inner position. When the rotor has rotated through an angle of approximately 120° from the position shown in Fig. 2, the blade 41 will have just reached its outer position while the blade 42 will begin to move to its inner position. During this transition the blade 40 will have moved to the inner position.

When the rotor has rotated through 180° from the position shown in Fig. 2, the blade 41 will begin to move inwardly while the blade 40 will have reached the outer position. During this transition the blade 42 will have moved to the inner position. From this point on the cycle of operation just described repeats itself.

Thus it will be seen that at all times at least one rotor blade and one stator blade are producing a full braking effect, while the other rotor blade and one stator blade are producing at least a partial braking effect. The braking effect produced on the rotor by any one set of blades will, of course, be a pulsating one between a maximum value and a minimum value, but the integrated effect of all the blades will approach a constancy.

The degree of the braking effect is controlled in the following manner. When fluid is trapped between a rotor and a stator blade, as for example between rotor blade 18 and stator blade 42 (see Fig. 2) it flows past the spring seated check valve 37 and through passages 36 to the two annular grooves 30. From the right hand groove 30 (as viewed in Figs. 4 and 5) the fluid flows past the ball check valve 32 and through passage 33 to chambers 34. In each chamber 34 the fluid, which is now under a very high pressure, reacts on the balancing piston 39 urging this piston outwardly. This piston is much smaller than the application piston 52, so that a high pressure in the chamber 34 may be balanced by a low pressure in the piston chamber. As a consequence the ultimate inward position of the stator blade is determined by this balance of pressures. The balance is made sensitive due to the balance of pressures on each stator blade, so that the degree of braking may be controlled in reasonably fine increments.

It is intended that when the balance takes place between the pressures in chamber 34 and above piston 52, that the balancing piston will be in a position to close the large port 57. Fluid may, however, flow through the restricted port 56 in each balancing piston to the chamber 58 in each application cylinder, and from this cylinder will then flow back to the supply chamber 25 through the communication heretofore described. This permits circulation of enough of the fluid to provide for adequate cooling. From the filling chamber 60 this fluid is forced back into the chamber 25 by the pump device.

The flow through the restricted ports 56 in the balancing pistons 39 is not rapid enough to permit a very large quantity of the fluid trapped between the rotor and stator blades to escape by these communications, but the greater portion of the fluid must pass through the orifice formed between the end of the stator blade and the rotor periphery. This is the orifice which determines the degree of braking. Thus the degree of braking is determined by the circulation of the fluid wholly within the braking chambers, past the ends of the stator blades, rather than circulation out of the braking chamber and through external restricted orifices, as in the heretofore referred to prior devices.

Since the supply chamber 25 is under air pressure, such fluid as is returned to this chamber through the communications described, is replaced by an equal volume forced back into the rotor chamber 24 (through pipe and passage 27 and passage 26 in the shaft 11) and from thence past check valves 28 and 29 to the braking chambers 21 and 22, so that the volume of fluid in the braking chambers is maintained substantially constant. It will be noted that the check valves are so located as to permit this flow during a braking operation.

If now while the device is producing a braking effect the wheels thus braked begin to slip, the speed of rotation of the rotor 14 will diminish, and consequently the braking effect as well as the pressure forcing fluid to the chambers 34 below the balancing pistons 39 will diminish. As a result, the air pressure acting on the application pistons 52 will tend to force the stator blades inwardly to increase the braking effect. This would, however, aggravate the wheel sliding condition, which is undesirable.

In order to prevent such a condition the ball check valve 32 is provided to prevent the back flow of fluid from the chambers 34 into the braking chambers. This traps a column of fluid in each chamber 34 which will prevent immediate inward movement of the stator blades. This column of fluid will however in time gradually diminish due to flow through the restricted orifice 56. When sufficient fluid will have passed through this small port so as to permit the stator blades to move inwardly, the wheel sliding condition will in all probability have passed so that fluid will again be supplied to the chambers 34.

In order to prevent a column of oil remaining in each chamber 34 after the brakes have been released, so as to provide for producing a fast initial braking effect, the large port 57 is provided in each balancing piston. When the air pressure in each of the application cylinders 53, 54, and 55 is reduced to atmospheric pressure, and the balancing pistons therefore permitted to return to their release positions as shown in Fig. 4, a portion of the oil in each chamber 34 escapes quickly by way of the large port 57. This creates an air space in each chamber 34 so as to permit a rapid inward movement of the balancing piston and consequently a rapid inward movement of the stator blade.

If at any time during operation of the brake device the braking effect should suddenly diminish, as due to accidental escape of the fluid in the braking chambers, then after an interval of time which is determined by the escape of fluid through the restricted port 56 in each of the balancing pistons 39, the application piston 52 in chamber 53 will move inwardly far enough to open communication between the pipe 49 and the brake cylinder pipe 96. This will permit an application of the auxiliary brake to a degree corresponding to the degree of air pressure in the pipe 49.

It is intended that the movement of the application piston 52 necessary to establish this communication and thus apply the auxiliary brake shall be greater than that normally required to affect a maximum braking effect through operation of the fluid brake device. Thus the auxiliary brake is applied only when the fluid brake becomes practically ineffective.

When the fluid brake device is operating and the speed of the vehicle diminishes, the pressure exerted on the fluid in the braking chambers will diminish, and consequently the braking effect. The rate at which fluid is forced into the chamber 34 will, of course, diminish as the pressure acting on the fluid diminishes, so that the escape of fluid through the restricted port 56 will permit the stator blades to be moved further inwardly. This will tend to compensate for the loss of braking effect due to decrease in speed. When a very low speed is reached the application piston 52 in application chamber 53 will have moved inwardly far enough to open communication to the brake cylinder 95, so that the auxiliary brake will be applied. Thus as the speed of the vehicle diminishes the auxiliary brake is cut into action as the fluid brake decreases in effectiveness.

If at any time after the fluid brake is in operation it is desired to decrease the braking effect produced thereby, the air pressure acting on the application pistons 52 is diminished by suitable manipulation of the brake valve handle 99. To render the brake device wholly ineffective, the brake valve handle 99 is turned to the release position so as to vent all of the application cylinders. If in the meanwhile the auxiliary brake has been applied, this movement of the handle will also release this brake.

It should also be noted that when the auxiliary brake is applied the valve 62 associated with the application cylinder 53 moves to its seat 66 to vent the supply chamber 25. At all other times the chamber 25 is maintained under air pressure.

As will be evident from the foregoing, the fluid brake device is most effective when the rotor is rotated at relatively high speeds. By connecting the rotor to a drive motor shaft the effectiveness of the fluid brake is extended over a wider speed range. It is to be understood, however, that the invention is in no wise limited to such an arrangement, but that this is merely a preferred arrangement in practice.

It will of course be appreciated that the fluid brake device will be equally effective for both directions of travel of a vehicle.

While I have described my invention with particular reference to one embodiment thereof, it is not my intention to be limited to the particular structural features illustrated and described, but these are to be taken as merely illustrative of the principle underlying the invention, and that the invention, broadly speaking, is defined in the appended claims.

Having now described my invention, what I claim as new and desire to secure by Letters Patent, is:

1. In a vehicle brake device, in combination, a stator having a chamber, a rotor operable in said chamber, an element carried by said rotor and a movable element associated with said stator coacting upon a fluid in said chamber to produce a braking effect on said rotor, and means for substantially balancing the fluid pressures acting on said stator element in both a radial and a peripheral direction whereby said stator element is movable under relatively low control forces.

2. In a vehicle brake mechanism, in combination, a stator member having a braking chamber, a rotor operable in said chamber, an element attached to said rotor and operable to impel a fluid supplied to said chamber, a second element associated with said stator, means for moving said stator element into the path of movement of said rotor element whereby the fluid impelled by said rotor element is caused to produce a braking effect on said rotor, said means being operable to actuate said stator element in timed relation with the rotation of said rotor element, and means including balancing chambers open to said braking chamber by communications of fixed size for substantially balancing the fluid pressures acting on said stator element whereby the movement of said element is facilitated.

3. In a vehicle brake device, in combination, means defining a chamber, a rotor operable in said chamber, an element carried by said rotor and being adapted to impel a fluid contained in said chamber, a second element adapted to be actuated into said chamber to cause said first element to exert pressure on said fluid, whereby a braking effect is produced on said rotor, means for urging said second element into said chamber, and means for controlling the movement of said second element into said chamber according to the degree of pressure exerted on said fluid.

4. In a vehicle brake mechanism, in combination, a stator member having a chamber, a rotor member operable in said chamber, a blade element carried by said rotor and being operable to impel a fluid in said chamber, a second blade element associated with said stator, means for producing a reciprocating movement of said stator blade element in timed relation with the rotation of said rotor blade element, whereby a braking effect is produced on said rotor through action of said two blade elements on said fluid, and means subject to the pressure exerted on said fluid and to a regulatory pressure for controlling the reciprocating movement of said stator blade element.

5. In a vehicle brake system, in combination, a stator member having a chamber, a rotor operable in and concentric to said chamber, a fixed element associated with said rotor and a movable element associated with said stator coacting upon a fluid supplied to said chamber to produce a braking effect on said rotor, and control means subject both to a pneumatic pressure and to the pressure exerted on said fluid in said chamber for controlling movement of said stator element.

6. In a vehicle brake system, in combination, a stator member having a chamber, a rotor operable in said chamber, an element carried by said rotor and operable to impel a fluid contained in said chamber, a second element associated with said stator and adapted to be periodically moved into the path of movement of said rotor element in timed relation therewith, to produce through action on the fluid supplied to said chamber a braking effect on said rotor, a pipe in which the pressure of a control fluid supplied thereto is varied to effect and control an application of the brakes, means governed by the pressure of the control fluid in said pipe and by the pressure exerted on the fluid in said chamber for controlling the degree of braking effect produced on said rotor, and means whereby the pressure of the control fluid in said pipe is effective in supplying fluid to said stator chamber.

7. In a vehicle brake device, in combination, a stator member having a chamber, a rotor operable in said chamber, an element carried by said rotor and operable to impel a fluid contained in said chamber, a second element associated with said stator and adapted to be actuated into the path of movement of said rotor element in timed relation with the rotation thereof, to cause a braking effect to be produced on said rotor through action on fluid supplied to said chamber, means for controlling the degree of braking effect on said rotor including a control member subject on one side to a regulatory pressure and on the other side to pressure exerted on the fluid in said chamber, said control member being movable upon a decrease of pressure in said chamber to increase the degree of braking effect produced on said rotor, and means for delaying movement of said control member for a predetermined length of time upon a sudden decrease of pressure in said chamber.

8. In a vehicle brake system, in combination, a stator having a chamber, a rotor concentric to and rotatable in said chamber, a blade carried by said rotor and operable to impel a fluid contained in said chamber, a second blade associated with said stator and adapted to be periodically moved into the path of movement of said rotor blade in timed relation therewith, to cause a braking effect to be produced on said rotor through action on said fluid, control means for controlling the degree of movement of said stator blade into the path of movement of said rotor blade, said control means including a movable abutment subject on one side to a regulatory pressure and on the other side to pressure exerted on said fluid, and being operable upon a sudden decrease of pressure exerted on said fluid to cause said stator blade to be actuated into the path of movement of said rotor blade to a greater degree, whereby to increase the braking effect on said rotor, and means operable to retard the movement of said stator blade.

9. In a vehicle brake system, in combination, a fluid brake device having a rotor and a chamber coacting to operate upon a fluid contained in said chamber to produce a braking effect, a brake operating device for operating an auxiliary brake to also produce a braking effect, a movable abutment subject on one side to a regulatory pressure and on the other side to the pressure of fluid in said chamber, and means operative upon a predetermined movement of said abutment due to a decrease of pressure in said chamber for effecting operation of said brake operating device.

10. In a vehicle brake system, in combination, a fluid brake device having a stator provided with a braking chamber and a rotor operable in said chamber, an element movable into said chamber to cause said rotor and stator to operate upon a fluid contained in said chamber to produce a braking effect, control means having a first chamber subject to a regulatory pressure and a second chamber subject to the pressure exerted on said fluid in said braking chamber for controlling the degree of movement of said element into said braking chamber, whereby to control the degree of braking effect produced, an auxiliary brake operating device for operating an auxiliary brake, and means responsive to a predetermined movement of said element into said braking chamber for effecting operation of said auxiliary brake operating device.

11. In a vehicle brake system, in combination, a stator member having a chamber, a rotor operable in said chamber, an element adapted to be actuated into said chamber to different degrees to cause a braking effect to be produced on said rotor through action on a fluid in said chamber, a movable abutment subject on one side to a regulatory pressure and on the other side to the pressure exerted on said fluid, and operable upon a decrease of said latter pressure to actuate said element into said chamber to a greater degree, an auxiliary brake operating device, means operable upon a predetermined decrease of pressure exerted on said fluid for effecting operation of said auxiliary brake operating device, and means for delaying the operation of said auxiliary brake operating device.

12. In a vehicle brake system, in combination, a fluid brake device operating upon a fluid to produce a braking effect, a brake operating device for operating a friction brake, a pipe to which air under pressure is supplied to effect an application of the brakes, control means having a member subject to the pressure of air supplied to said pipe and to the pressure exerted on said fluid in said fluid brake device for controlling the degree of braking effect produced by said fluid brake device, the braking effect produced by said fluid brake device and the pressure exerted on the fluid therein diminishing as the speed of the vehicle diminishes, and means operable upon a predetermined movement of said control member due to decrease of pressure exerted on said fluid in said fluid brake device for effecting operation of said brake operating device according to the pressure of air supplied to said pipe.

13. In a vehicle brake system, in combination, a stator member having a braking chamber and a supply chamber, a rotor operable in said braking chamber, an element carried by said rotor and an element associated with said stator for operating upon fluid supplied to said braking chamber from said supply chamber to produce a braking effect on said rotor, means for controlling the coaction of said two elements according to a desired degree of braking effect, means for subjecting said supply chamber to pressure to cause fluid to be supplied from said chamber to said braking chamber, and a pump for returning fluid to said supply chamber against opposition of the pressure therein.

14. In a vehicle brake device, in combination, a stator device having a chamber, a rotor having a blade operable in said chamber to impel a fluid contained in said chamber, a second blade associated with said stator, a first spring means for urging said stator blade into the path of movement of said rotor blade, a second spring means normally overcoming said first spring means to urge said stator blade out of the path of movement of said rotor blade, and means subject to fluid pressure in said chamber for controlling the effectiveness of said last mentioned spring means.

15. In a vehicle brake device, in combination, a stator member having a chamber, a rotor having a blade operable in said chamber to impel a fluid contained in said chamber, a second blade associated with said stator, a first spring means for urging said stator blade into the path of movement of said rotor blade, a second spring means for overcoming said first spring means to urge said stator blade out of the path of movement of said rotor blade, and means subject to both a regulatory air pressure and the pressure of fluid in said chamber for controlling the effectiveness of said second spring means.

16. In a vehicle brake device, in combination, a stator member having a chamber, a rotor having a blade operable in said chamber to impel a fluid contained in said chamber, a second blade associated with said stator member, a first spring means for urging said stator blade into the path of movement of said rotor blade, a second spring means for urging said stator blade out of the path of movement of said rotor blade, and means subject to both a regulatory air pressure and fluid pressure in said chamber for controlling which of said two spring means dominates the other.

17. In a vehicle brake device, in combination, a stator member having a chamber, a rotor operable in said chamber and having a blade for impelling a fluid contained in said chamber, a second blade associated with said stator member, a lever device for actuating said stator blade back and forth into and out of the path of movement of said rotor blade, a first spring means for urging said lever device in one direction, a second spring means for urging said lever device in an opposite direction, and fluid pressure responsive means for controlling the pressure exerted by one of said two spring means.

18. In a vehicle brake device, in combination, a stator member having a chamber, a rotor operable in said chamber and having a blade for impelling a fluid contained in said chamber, a second blade associated with said stator member, a first spring means for urging said stator blade out of the path of movement of said rotor blade, a second spring means for urging said stator blade into the path of movement of said rotor blade, fluid pressure operated means responsive to opposing fluid pressures for causing said last mentioned spring means to position said stator blade into the path of movement of said rotor blade according to the degree of one of said fluid pressures, and means for moving said stator blade out of the path of movement of said rotor blade as it approaches said stator blade.

19. In a vehicle brake device, in combination, a stator member having a chamber, a rotor member rotatable in said chamber, a blade associated with said rotor member and operable to impel a fluid contained in said chamber, a second blade associated with said stator member, a first spring for urging said stator blade into the path of movement of said rotor blade, a second spring for urging said stator blade out of the path of movement of said rotor blade, fluid pressure operated means subject to opposing fluid pressures for overcoming said second spring according to the degree of one of said pressures whereby said first spring actuates said stator blade into the path of movement of said rotor blade, and cam means for actuating said stator blade out of the path of movement of said rotor blade as it approaches.

20. In a vehicle brake device, in combination, a stator member having a braking chamber, a rotor member rotatable in said chamber and having a blade for impelling a fluid contained in said braking chamber, a second blade associated with said stator member and movable back and forth into and out of the path of movement of said rotor blade, means for forming balancing chambers adjacent the sides of said stator blade not exposed to the fluid in said braking chamber, and means for conducting fluid under pressure from said braking chamber to said balancing chambers for balancing the pressures acting on said stator blade.

21. In a vehicle brake device, in combination, a stator member having a chamber, a rotor member rotatable in said chamber and having a blade for impelling a fluid contained in said chamber, a second blade associated with said stator member, means for moving said second blade into and out of the path of movement of said rotor blade, whereby said two blades coact upon the fluid contained in said chamber to produce a braking effect on said rotor member, means for conducting a portion of the fluid acted upon by said two blades out of said chamber to a separate chamber for cooling purposes, and means for automatically resupplying fluid to said stator chamber when conducted away as aforesaid.

22. In a fluid brake device, in combination, an element adapted to control the degree of braking of the fluid brake device according to the degree of its movement away from a biased position, pneumatic means operable upon an increase in pneumatic pressure for moving said element away from said biased position, spring means for opposing said movement of said element, and pressure operated means responsive to fluid under pressure in said brake device for also opposing movement of said element.

23. In a vehicle brake device, in combination, a stator device having a chamber, a rotor having a blade operable in said chamber to impel a fluid contained in said chamber, a second blade associated with said stator, a first spring means for urging said stator blade into the path of movement of said rotor blade, a second spring means normally overcoming said first spring means to urge said stator blade out of the path of movement of said rotor blade, and means including a movable abutment subject to opposing fluid pressures for determining the effectiveness of said last mentioned spring means.

24. In a vehicle brake device, in combination, a stator device having a braking chamber, a rotor having a blade operable in said chamber to impel a fluid contained in said chamber, a second blade associated with said stator, a first spring means for urging said stator blade into the path of movement of said rotor blade, a second spring means normally overcoming said first spring means to urge said stator blade out of the path of movement of said rotor blade, two fluid pressure control chambers one of which is subject to the pressure of fluid in said braking chamber and the other of which is subject to the pressure of a control fluid, and means including an abutment subject to the pressures in both of said chambers for controlling the effectiveness of said last mentioned spring means.

25. In a vehicle brake device, in combination, a stator member, a rotor member, a plurality of blades associated with said stator member, a plurality of coacting blades associated with said rotor member, the number of rotor blades being less than the number of stator blades, means so constructed and arranged as to cause said rotor and stator blades to operate upon a confined fluid to produce a braking effect on said rotor member when rotating, and means controlled by opposing fluid pressures for controlling the degree of braking effect produced on said rotor member.

26. In a vehicle brake device, in combination, a stator device having a chamber, a rotor having a fixed blade thereon operable in said chamber to impel a fluid contained in said chamber, a second blade movably associated with said stator, and means for moving said second blade into and out of the path of movement of said rotor blade whereby a braking effect is produced on said rotor by action on said fluid in said chamber, said last means comprising a movable abutment operable in response to a control pressure for effecting movement of said stator blade into the path of movement of said rotor blade and subject to the pressure of said fluid in said chamber for determining the degree of movement of said stator blade.

27. In a fluid brake device, in combination, means defining a chamber adapted to contain a fluid therein, a plurality of coacting elements one of which is rotatable, means so constructed and arranged as to cause said plurality of elements to act upon said fluid to produce a braking effect on said rotatable element, and means for causing the degree of said braking effect to be controlled in accordance with the position of balance of a control element acted upon by a control fluid and the pressure of fluid in said chamber.

28. In a fluid brake device, in combination, a stator member having a chamber, a rotor member rotatable in said chamber, elements carried by said stator and rotor members and operable upon said fluid to produce a braking effect on said rotor member, and means subject to both a regulatory fluid pressure and the pressure of fluid in said chamber for controlling the degree of said braking effect in accordance with the degree of one of said pressures.

BURTON S. AIKMAN.